US011952798B2

(12) United States Patent
He et al.

(10) Patent No.: US 11,952,798 B2
(45) Date of Patent: Apr. 9, 2024

(54) MOTOR DRIVING CIRCUIT, CONTROL METHOD THEREFOR, AND DRIVING CHIP

(71) Applicant: GREE ELECTRIC APPLIANCES, INC. OF ZHUHAI, Guangdong (CN)

(72) Inventors: Ji He, Zhuhai (CN); Junchao Chen, Zhuhai (CN); Yang Lan, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 536 days.

(21) Appl. No.: 17/205,978

(22) Filed: Mar. 18, 2021

(65) Prior Publication Data

US 2021/0207400 A1 Jul. 8, 2021

Related U.S. Application Data

(63) Continuation of application No. PCT/CN2019/109274, filed on Sep. 30, 2019.

(51) Int. Cl.
*E05B 47/00* (2006.01)
*E05B 47/06* (2006.01)

(52) U.S. Cl.
CPC .......... *E05B 47/00* (2013.01); *E05B 47/0003* (2013.01); *E05B 47/0615* (2013.01); *E05B 2047/0092* (2013.01)

(58) Field of Classification Search
CPC .. E05B 47/00; E05B 47/0001; E05B 47/0003; E05B 47/0093; E05B 47/06;
(Continued)

(56) References Cited

U.S. PATENT DOCUMENTS 9,327,825 B2 * 5/2016 White .................. G05D 1/0077
2007/0204073 A1 * 8/2007 Chen ....................... G06F 13/28
710/22

(Continued)

FOREIGN PATENT DOCUMENTS

CN 202672885 U 1/2013
CN 204531699 U 8/2015

(Continued)

OTHER PUBLICATIONS

NPL Search (Oct. 30, 2023).*

*Primary Examiner* — Van T Trieu
(74) *Attorney, Agent, or Firm* — J. Miguel Hernandez; James R. Gourley; Carstens, Allen & Gourley, LLP

(57) ABSTRACT

Provided are a motor driving circuit, a control method therefor, and a driving chip. The motor driving circuit includes a logic module and a push-pull module, a channel selection module, an instruction recognition module, and an isolating switch module. An input signal is outputted by the logic module and the push-pull module to control the motor. The channel selection module is configured to select a channel for the input signal to make the input signal to be connected to the isolating switch module or the instruction recognition module, or disconnected. The instruction recognition module is configured to perform a corresponding operation on the isolating switch module according to an inputted instruction. The isolating switch module is configured to receive an instruction of the channel selection module and an instruction of the instruction recognition module to connect or disconnect the logic module.

19 Claims, 5 Drawing Sheets

(58) Field of Classification Search
CPC .... E05B 47/0615; G05D 1/00; G05D 1/0077; G07C 9/00; G07C 9/00944; B64C 13/00; B64C 13/02; H04Q 11/00; H04Q 11/04
See application file for complete search history.

(56) References Cited

U.S. PATENT DOCUMENTS

| | | | | |
|---|---|---|---|---|
| 2007/0280223 | A1* | 12/2007 | Pan | H04L 49/606 370/360 |
| 2016/0054148 | A1 | 2/2016 | Misfatto | |
| 2017/0328130 | A1 | 11/2017 | Baker et al. | |

FOREIGN PATENT DOCUMENTS

| | | | |
|---|---|---|---|
| CN | 104899945 | A | 9/2015 |
| CN | 105201292 | A | 12/2015 |
| CN | 205476951 | U | 8/2016 |
| CN | 206515940 | U | 9/2017 |
| EP | 0818596 | A3 | 2/1998 |
| GB | 2459248 | A | 10/2009 |
| TW | M552948 | U | 12/2017 |
| WO | 2014154738 | A1 | 10/2014 |

* cited by examiner

| INPUT | | OUTPUT | | MODE |
|---|---|---|---|---|
| INA | INB | OUTA | OUTB | |
| L | L | Hi-Z | Hi-Z | Standby（STOP） |
| H | L | H | L | Forward |
| L | H | L | H | Reverse |
| H | H | L | L | Brake |

FIG. 2（Prior Art）

| CS | INA | INB | SEL0 | SEL1 | Channel Selection Module |
|---|---|---|---|---|---|
|  | L | H | L | H | A----Q0 |
| L | L | H | L | H | Remain a previous state |
|  | H | L | H | L | A----Q1 |
| L | H | L | H | L | Remain a previous state |
| 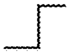 | H | H | H | H | A----Q2 |
| L | H | H | H | H | Remain a previous state |
FIG. 6
| EN0 | EN1 | INA/ INB | INA1/ INB | INAOUT/ INBOUT | Channel Selection Module |
|---|---|---|---|---|---|
| 0 | 0 | 0 | 1 | 1 | A---Q0 |
| 0 | 1 | 0 | 1 | 1 | A---Q0 |
| 0 | 1 | 0 | 1 | 1 | A---Q0 |
| 1 | 1 | 0 | 1 | 0 | A---Q0 |
| 1 | 1 | 1 | 0 | 1 | A---Q0 |
FIG. 7

MOTOR DRIVING CIRCUIT, CONTROL METHOD THEREFOR, AND DRIVING CHIP

RELATED APPLICATIONS

This application claims priorities of China Patent Application No. 201811259337.9, filed on Oct. 26, 2018, entitled "MOTOR DRIVING CIRCUIT, CONTROL METHOD THEREFORE, AND DRIVING CHIP", the content of which is hereby incorporated by reference in its entirety. This application is a continuation under 35 U.S.C. § 120 of international patent application PCT/CN2019/109274, filed on Sep. 30, 2019 and published as WO 2020/083008 A1 on Apr. 30, 2020, the content of which is also hereby incorporated by reference in its entirety. Every application and publication listed in this paragraph is hereby incorporated by reference in its entirety.

TECHNICAL FIELD

The present disclosure relates to the field of electronic circuits, and particularly to a motor driving circuit, a control method for the motor driving circuit, and a driving chip.

BACKGROUND

With the development of technology and the acceleration of the integration of smart home, the smart door lock has been widely used by thousands of households. The door lock, as a preliminary safety barrier for a user's home, may be used by the user every day, therefore the safety of the door lock is the most important factor which the user considered. Nowadays, the smart door lock is controlled by a motor driving chip, a DC motor, and a microcontroller. As shown in FIGS. 1 and 2, the motor driving chip includes a logic module 1', a push-pull output module 2', and a thermal protection module 3'. An input signal of the motor driving chip is driven by an amplitude level, and is prone to be impacted by a strong electromagnetic pulse generated by the Tesla coil, therefore, the motor driving chip may mistakenly control the motor to operate, thus unlocking the door lock and causing an unfavorable security risk of the door lock.

SUMMARY

In the related art, a motor driving circuit is driven by the amplitude level, which is prone to be affected by the Tesla coil and causes the motor to mistakenly operate, thus unlocking the door lock and reducing the safety. In view of this technical problem, in some embodiments, the present disclosure is to provide a motor driving circuit, a control method for the motor driving circuit, and a driving chip.

A motor driving circuit, which includes a logic module and a push-pull module, a channel selection module, an instruction recognition module, and an isolating switch module. An input signal is outputted by the logic module and the push-pull module to control the motor.

The channel selection module is connected to the isolating switch module and the instruction recognition module, respectively, and configured to select a channel for the input signal to make the input signal to be connected to the isolating switch module or the instruction recognition module, or disconnected.

The instruction recognition module is connected to the channel selection module and the isolating switch module, respectively, and configured to perform a corresponding operation on the isolating switch module according to an inputted instruction.

The isolating switch module is connected to the channel selection module, the instruction recognition module, and the logic module, respectively, and configured to receive an instruction of the channel selection module and an instruction of the instruction recognition module to connect or disconnect the logic module.

In an embodiment, the motor driving circuit further includes a noise detection module. The noise detection module is connected to the isolating switch module, and configured to detect an operation noise voltage of the motor driving circuit, and the isolating switch module is disconnected when the operation noise voltage is greater than a preset threshold.

In an embodiment, the motor driving circuit further includes a thermal protection module. The thermal protection module is configured to detect a temperature of the motor driving circuit, and the motor driving circuit is turned off when the temperature of the motor driving circuit is greater than a set temperature.

In an embodiment, the channel selection module includes a first buffer, a second buffer, a third buffer, a first NOT gate, a second NOT gate, a first analog switch, a second analog switch, a first flip-flop, and a second flip-flop. An input of the first buffer is connected to receive a first input signal, and an output of the first buffer is connected to a first input of the first flip-flop. An input of the second buffer is connected to receive a second input signal, and an output of the second buffer is connected to a first input of the second flip-flop. An input of the third buffer is connected to receive a third input signal, and an output of the third buffer is connected to a second input of the first flip-flop and a second input of the second flip-flop, respectively. An input of the first NOT gate is connected to receive the first input signal, and an output of the first NOT gate is connected to an input of the first analog switch. An input of the second NOT gate is connected to receive the second input signal, and an output of the second NOT gate is connected to an input of the second analog switch. A first output of the first analog switch is connected to an output of the first flip-flop, a second output of the first analog switch is connected to an output of the second flip-flop, a third output of the first analog switch is connected to the isolating switch module, and a fourth output of the first analog switch is connected to the instruction recognition module. A first output of the second analog switch is connected to the output of the first flip-flop, a second output of the second analog switch is connected to the output of the second flip-flop, a third output of the second analog switch is connected to the isolating switch module, and a fourth output of the second analog switch is connected to the instruction recognition module.

In an embodiment, the first flip-flop and the second flip-flop are both D flip-flops.

In an embodiment, the isolating switch module includes a first AND gate, a second AND gate, a third flip-flop, a fourth flip-flop, a fourth buffer, a fifth buffer, a third NOT gate, and a fourth NOT gate. A first input of the first AND gate is connected to a noise detection module, a second input of the first AND gate is connected to the instruction recognition module, and an output of the first AND gate is connected to an input of the fourth buffer. A first input of the second AND gate is connected to the noise detection module, a second input of the second AND gate is connected to the instruction recognition module, and an output of the second AND gate is connected to an input of the fifth buffer. An input of the third flip-flop is connected to the third output of the first analog switch, and an output of the third flip-flop is connected to a first input of the third NOT gate. An input of the fourth flip-flop is connected to the third output of the second analog switch, and an output of the fourth flip-flop is connected to a first input of the fourth NOT gate. An output of the fourth buffer is connected to a second input of the third NOT gate. An output of the fifth buffer is connected to a second input of the fourth NOT gate. An output of the third NOT gate is connected to the logic module. An output of the fourth NOT gate is connected to the logic module.

In an embodiment, the third flip-flop and the fourth flip-flop are both Schmidt flip-flops.

In an embodiment, the instruction recognition module is provided with turn-on instruction data and turn-off instruction data.

A motor driving chip, on which the above-mentioned motor driving circuit is integrated, is provided.

A control method for a motor driving circuit controls the above-mentioned motor driving circuit to control a drive motor to operate, and includes following steps:

- selecting, by the channel selection module, the channel for the input signal to make the input signal to be connected to the isolating switch module or the instruction recognition module, or disconnected;
- performing, by the instruction recognition module, the corresponding operation on the isolating switch module according to the inputted instruction; and
- receiving, by the isolating switch module, the instruction of the channel selection module and the instruction of the instruction recognition module to connect or disconnect the logic module. When the logic module is connected, a push-pull module outputs a signal to control the motor to operate, and when the logic module is disconnected, the motor is in a non-operation state.

In an embodiment, the method further includes: detecting, by the noise detection module, an operation noise voltage of the motor driving circuit; and disconnecting the isolating switch module when the operation noise voltage is greater than a preset threshold.

In the motor driving circuit, the control method for the motor driving circuit, and the driving chip provided in the present disclosure, by providing the channel selection module and isolating switch module, double isolations are formed, thus the anti-interference capability of the motor driving circuit is enhanced, the effect of the Tesla coil on the door lock is avoided, the circuit reliability is improved, the safety is enhanced, and the number of General Purpose Inputs/Outputs (GPIOs) communicating with the controller is reduced.

BRIEF DESCRIPTION OF THE DRAWINGS

FIG. 2 is a logic control chart of the motor driving chip described in the background of the present disclosure.

FIG. 6 is a logic control chart of the channel selection module of the present disclosure.

FIG. 7 is logic control chart of the isolating switch module of the present disclosure.

DETAILED DESCRIPTION OF THE EMBODIMENTS

In order to make the technical solutions and advantages of the present disclosure clearer and better understood, a motor driving circuit, a control method therefor, and a driving chip of the present disclosure will be further described in detail below through embodiments with reference to accompanying drawings. It should be understood that the specific embodiments described herein are merely illustration of the present disclosure, but not intended to limit the present disclosure.

Figure 1:
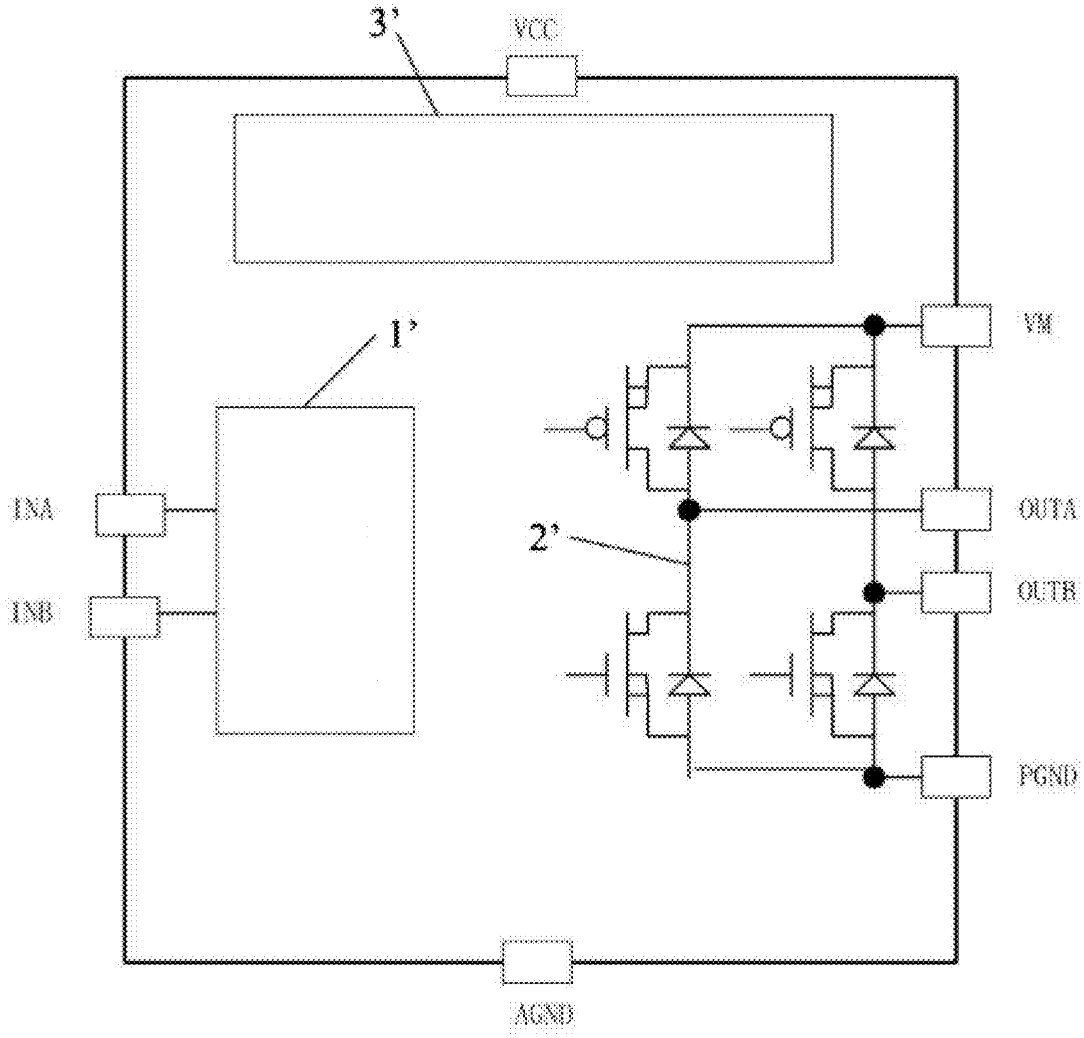
FIG. 1 (Prior Art)
FIG. 1 is a circuit diagram illustrating a motor driving chip described in the background of the present disclosure.
Figure 3:
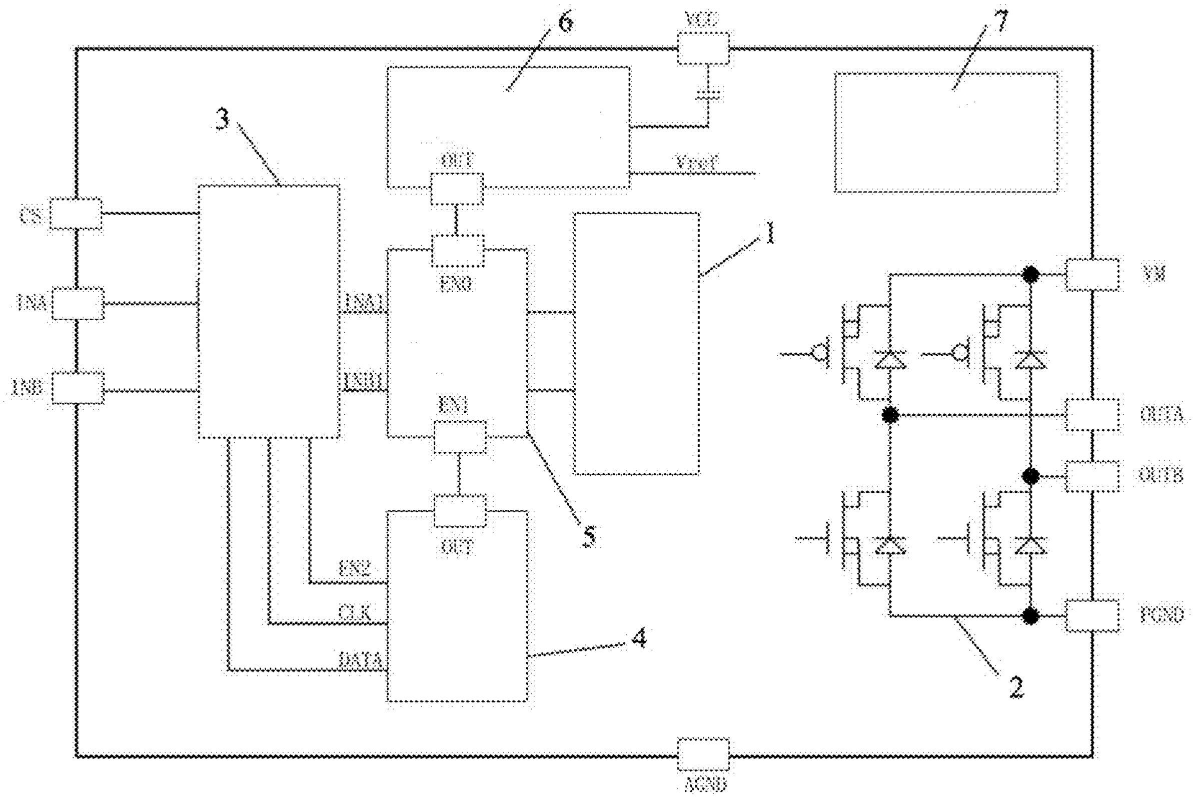
FIG. 3 is a diagram illustrating a motor driving circuit of the present disclosure.
Figure 4:
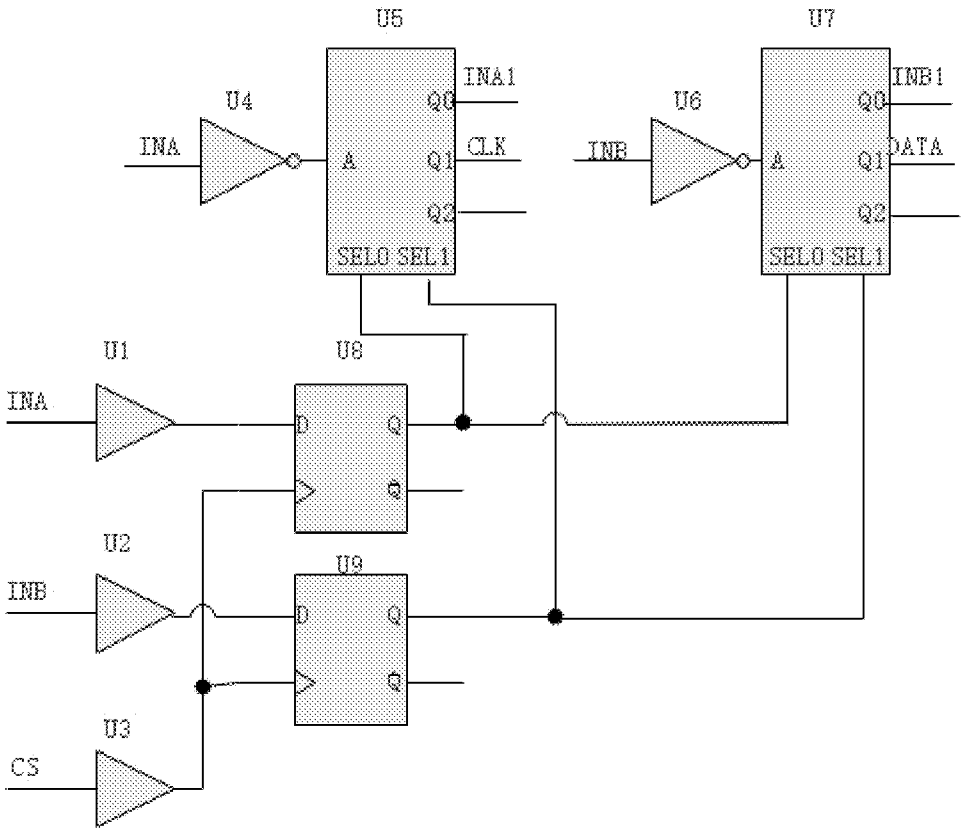
FIG. 4 is a circuit principle diagram of a channel selection module of the present disclosure.
Figure 5:
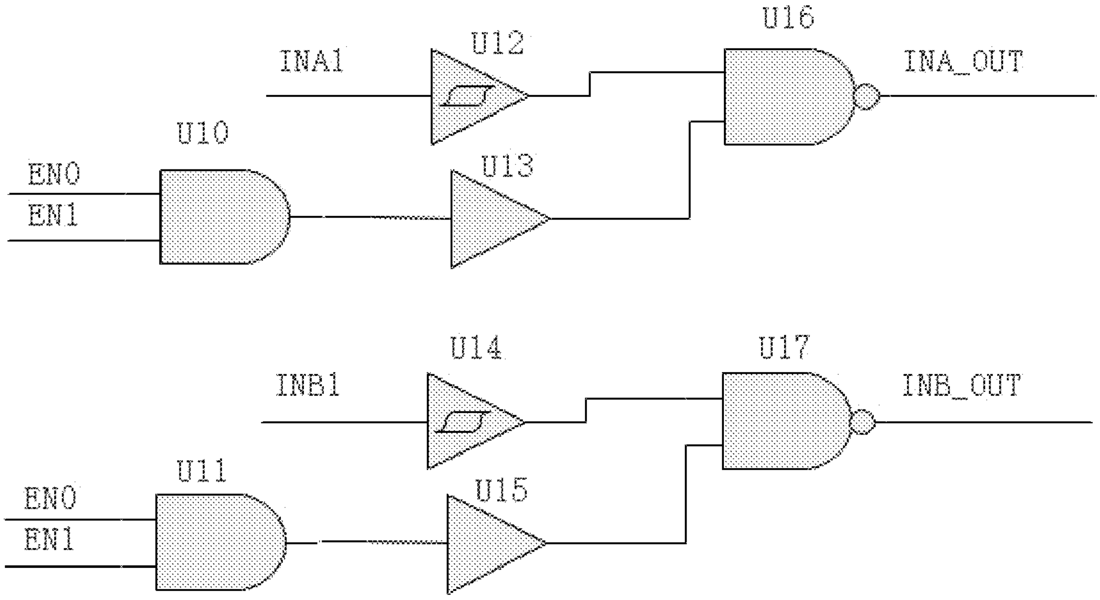
FIG. 5 is a circuit principle diagram of an isolating switch module of the present disclosure.

As shown in FIGS. 3 to 5, a motor driving circuit includes a logic module 1 and a push-pull module 2, through which an input signal is outputted to control a motor. The motor driving circuit also includes a channel selection module 3, an instruction recognition module 4, an isolating switch module 5, a noise detection module 6, and a thermal protection module 7.

The channel selection module 3 is connected to the isolating switch module 5 and the instruction recognition module 4, respectively, and is configured to select a channel for the input signal to make the input signal to be connected to the isolating switch module or the instruction recognition module, or disconnected.

The channel selection module 3 includes a first buffer U1, a second buffer U2, a third buffer U3, a first NOT gate U4, a second NOT gate U6, a first analog switch U5, a second analog switch U7, a first flip-flop U8, and a second flip-flop U9. An input INA of the first buffer U1 is connected to receive a first input signal, and an output of the first buffer U1 is connected to a first input D of the first flip-flop U8. An input INB of the second buffer U2 is connected to receive a second input signal, and an output of the second buffer U2 is connected to a first input D of the second flip-flop U9. An input CS of the third buffer U3 is connected to receive a third input signal, and an output of the third buffer U3 is connected to a second input of the first flip-flop U8 and a second input of the second flip-flop U9, respectively. An input INA of the first NOT gate U4 is connected to receive the first input signal, and an output of the first NOT gate U4 is connected to an input A of the first analog switch U5. An input INB of the second NOT gate U6 is connected to receive the second input signal, and an output of the second NOT gate U6 is connected to an input A of the second analog switch U7. A first output SEL0 of the first analog switch U5 is connected to an output Q of the first flip-flop U8, a second output SEL1 of the first analog switch U5 is connected to an output Q of the second flip-flop U9, a third output Q0 of the first analog switch U5 is connected to the isolating switch module 5, and a fourth output Q1 of the first analog switch U5 is connected to the instruction recognition module 4. A first output SEL0 of the second analog switch U7 is connected to the output Q of the first flip-flop U8, a second output SEL1 of the second analog switch U7 is connected to the output Q of the second flip-flop U9, a third output Q0 of the second analog switch U7 is connected to the isolating switch module 5, and a fourth output Q1 of the second analog switch U7 is connected to the instruction recognition module 4. The first flip-flop U8 and the second flip-flop U9 are both D flip-flops.

The instruction recognition module 4 is connected to the channel selection module 3 and the isolating switch module 5, respectively, and is configured to perform a corresponding operation on the isolating switch module according to an inputted instruction. The instruction recognition module 4 is provided with turn-on instruction data and turn-off instruction data, and is configured to compare an inputted data with the turn-on instruction data or the turn-off instruction data and perform an operation corresponding to the turn-on instruction data or the turn-off instruction data if the inputted data are identical with the corresponding turn-on instruction data or the turn-off instruction data. The CLK is a clock signal provided for the instruction recognition module, and the DATA is a data signal provided for the instruction recognition module.

The isolating switch module 5 is connected to the channel selection module 3, the instruction recognition module 4, and the logic module 1, respectively, and is configured to receive an instruction of the channel selection module 3 and an instruction of the instruction recognition module 4 to connect or disconnect the logic module 1.

The isolating switch module 5 includes a first AND gate U10, a second AND gate U11, a third flip-flop U12, a fourth flip-flop U14, a fourth buffer U13, a fifth buffer U15, a third NOT gate U16, and a fourth NOT gate U17. A first input EN0 of the first AND gate U10 is connected to the noise detection module 6, a second input EN1 of the first AND gate U10 is connected to the instruction recognition module 4, and an output of the first AND gate U10 is connected to an input of the fourth buffer U13. A first input EN0 of the second AND gate U11 is connected to the noise detection module 6, a second input EN1 of the second AND gate U11 is connected to the instruction recognition module 4, and an output of the second AND gate U11 is connected to an input of the fifth buffer U15. An input INA1 of the third flip-flop U12 is connected to the third output Q0 of the first analog switch U5, and an output of the third flip-flop U12 is connected to a first input of the third NOT gate U16. An input INB1 of the fourth flip-flop U14 is connected to the third output Q0 of the second analog switch U7, and an output of the fourth flip-flop U14 is connected to a first input of the fourth NOT gate U17. An output of the fourth buffer U13 is connected to a second input of the third NOT gate U16. An output of the fifth buffer U15 is connected to a second input of the fourth NOT gate U17. An output of the third NOT gate U16 is connected to the logic module 1. An output of the fourth NOT gate U17 is connected to the logic module 1. The third flip-flop U12 and fourth flip-flop U14 are both Schmidt flip-flops.

The noise detection module 6 is connected to the isolating switch module 5, and is configured to detect an operation noise voltage of the motor driving circuit. The isolating switch module is disconnected when the operation noise voltage is greater than a preset threshold. Generally, a reference voltage Vref is set. When the operation noise voltage is greater than the reference voltage Vref, the noise detection module 6 outputs a low level to make the isolating switch module disconnected, till a high level is outputted from the noise detection module 6 when the operation noise voltage is lower than the reference voltage Vref by a certain value.

The thermal protection module 7 is configured to detect a temperature of the motor driving circuit. The motor driving circuit is turned off when the temperature of the motor driving circuit is greater than a set temperature.

A motor driving chip, on which the above-mentioned motor driving circuit is integrated, is provided, A control method for a motor driving circuit controls the motor driving circuit, so as to control a drive motor to operate and then control a door lock, and includes following steps:

Step S1, selecting, by a channel selection module, a channel for an input signal to make the input signal to be connected to an isolating switch module or an instruction recognition module, or disconnected;

Step S2, performing, by the instruction recognition module, a corresponding operation on the isolating switch module according to an inputted instruction;

Step S3, receiving, by the isolating switch module, an instruction of the channel selection module and an instruction of the instruction recognition module to connect or disconnect the logic module. When the logic module is connected, the push-pull module outputs a signal to control the motor to operate. When the logic module is disconnected, the motor is in a non-operation state.

At the step S1, as shown in FIG. 6, when the input CS of the third buffer U3 changes from a low level to a high level, the input signals of the input INA of the first NOT gate U4 and the input INB of the second NOT gate U6 of the driving circuit are address signals of channels selecting. When the input CS of the third buffer U3 is at a low level, signals of the input INA of the first NOT gate U4 and the input INB of the second NOT gate U6 are a driving signal and an instruction recognition signal. When the input CS of the third buffer U3 is at a rising edge, the input INA of the first NOT gate U4 is at a high level, and the input INB of the second NOT gate U6 is at a low level, a signal channel between the input signal and the instruction recognition module is connected. When the input CS of the third buffer U3 is at a rising edge, the input INA of the first NOT gate U4 is at a low level, and the input INB of the second NOT gate U6 is at a high level, a signal channel between the input signal and the isolating switch module is connected. When the input CS of the third buffer U3 is at a rising edge, the input INA of the first NOT gate U4 is at a high level, and the input INB of the second NOT gate U6 is at a high level, the channel is disconnected.

At the step S2, the instruction recognition module defines a turn-on instruction of, for example, 0x11 0x22 0x33 0x44, and a turn-off instruction of, for example, 0x55 0x66 0x77 0x88.

At the step S3, as shown in FIG. 7, when the input EN2 of the instruction recognition module 4 is set to be a low level, the clock signal CLK and the data signal DATA of the instruction recognition module 4 are input, if it is determined that input data are identical with the turn-on instruction, the second inputs EN1 of the first AND gate U10 and the second AND gate U11 are set to be a high level, and meanwhile, if the noise voltage detected by the noise detection module is lower than the reference voltage Vref, the first inputs EN0 of the first AND gate U10 and the second AND gate U11 are set to be a high level, and then the channel between the isolating switch module and the logic module is connected, and the motor is driven and controlled via the input INA1 of the third flip-flop U12 and the input INB1 of the fourth flip-flop U14. When the input EN2 of the instruction recognition module 4 is set to a low level, the clock signal CLK and the data signal DATA of the instruction recognition module 4 are input, if it is determined that the input data are identical with the turn-off instruction, the second input EN1 is set to be a low level, such that the channel between the isolating switch module and the logic module is disconnected. When the first inputs EN0 of the first AND gate U10 and the second AND gate U11 or the second inputs EN1 of the first AND gate U10 and the second AND gate U11 are set to be a low level, an output INA_OUT of the third NOT gate U16 and an output INB_OUT of the fourth NOT gate U17 output a high level to the logic module in default, such that the chip operates in a Break mode, and the motor does not operate.

In the motor driving circuit, the control method for the motor driving circuit, and the driving chip provided in the present disclosure, by providing the channel selection module and isolating switch module, double isolations are formed, thus the anti-interference capability of the motor driving circuit is enhanced, the effect of the Tesla coil on the door lock is avoided, the circuit reliability is improved, the safety is enhanced, and the number of General Purpose Inputs/Outputs (GPIOs) communicating with the controller is reduced.

The technical features of the above-described embodiments may be arbitrarily combined. For the sake of brevity of description, not all possible combinations of the various technical features in the above embodiments are described. However, as long as there is no contradiction between the combinations of these technical features, all combinations should be considered within the scope of the disclosure.

The above-mentioned embodiments are merely several embodiments of the present disclosure, and the description thereof is more specific and detailed, but not intended to limit the scope of the disclosure. It should be noted that various variations and modifications may be made by those skilled in the art without departing from the conception of the present disclosure, and these variations and modifications are all within the scope of the present disclosure. Therefore, the scope of the present disclosure should be subject to the appended claims.

What is claimed is:

1. A motor driving circuit, comprising a logic module and a push-pull module, a channel selection module, an instruction recognition module, and an isolating switch module, wherein:

an input signal is outputted by the logic module and the push-pull module to control the motor;

the channel selection module is connected to the isolating switch module and the instruction recognition module, respectively, and configured to select a channel for the input signal to make the input signal to be connected to the isolating switch module or the instruction recognition module, or disconnected;

the instruction recognition module is connected to the channel selection module and the isolating switch module, respectively, and configured to perform a corresponding operation on the isolating switch module according to an inputted instruction; and the isolating switch module is connected to the channel selection module, the instruction recognition module, and the logic module, respectively, and configured to receive an instruction of the channel selection module and an instruction of the instruction recognition module to connect or disconnect the logic module.

2. The motor driving circuit according to claim 1, further comprising a noise detection module, wherein:

the noise detection module is connected to the isolating switch module, and configured to detect an operation noise voltage of the motor driving circuit; and the isolating switch module is disconnected when the operation noise voltage is greater than a preset threshold.

3. The motor driving circuit according to claim 1, further comprising a thermal protection module, wherein the thermal protection module is configured to detect a temperature of the motor driving circuit, and the motor driving circuit is turned off when the temperature of the motor driving circuit is greater than a set temperature.

4. The motor driving circuit according to claim 1, wherein:

the channel selection module comprises a first buffer, a second buffer, a third buffer, a first NOT gate, a second NOT gate, a first analog switch, a second analog switch, a first flip-flop, and a second flip-flop;

an input of the first buffer is connected to receive a first input signal, and an output of the first buffer is connected to a first input of the first flip-flop;

an input of the second buffer is connected to receive a second input signal, and an output of the second buffer is connected to a first input of the second flip-flop;

an input of the third buffer is connected to receive a third input signal, and an output of the third buffer is connected to a second input of the first flip-flop and a second input of the second flip-flop, respectively;

an input of the first NOT gate is connected to receive the first input signal, and an output of the first NOT gate is connected to an input of the first analog switch;

an input of the second NOT gate is connected to receive the second input signal, and an output of the second NOT gate is connected to an input of the second analog switch;

a first output of the first analog switch is connected to an output of the first flip-flop, a second output of the first analog switch is connected to an output of the second flip-flop, a third output of the first analog switch is connected to the isolating switch module, and a fourth output of the first analog switch is connected to the instruction recognition module; and a first output of the second analog switch is connected to the output of the first flip-flop, a second output of the second analog switch is connected to the output of the second flip-flop, a third output of the second analog switch is connected to the isolating switch module, and a fourth output of the second analog switch is connected to the instruction recognition module.

5. The motor driving circuit according to claim 4, wherein the first flip-flop and the second flip-flop are both D flip-flops.

6. The motor driving circuit according to claim 4, wherein:

the isolating switch module comprises a first AND gate, a second AND gate, a third flip-flop, a fourth flip-flop, a fourth buffer, a fifth buffer, a third NOT gate, and a fourth NOT gate;

a first input of the first AND gate is connected to a noise detection module, a second input of the first AND gate is connected to the instruction recognition module, and an output of the first AND gate is connected to an input of the fourth buffer;

a first input of the second AND gate is connected to the noise detection module, a second input of the second AND gate is connected to the instruction recognition module, and an output of the second AND gate is connected to an input of the fifth buffer;

an input of the third flip-flop is connected to the third output of the first analog switch, and an output of the third flip-flop is connected to a first input of the third NOT gate;

an input of the fourth flip-flop is connected to the third output of the second analog switch, and an output of the fourth flip-flop is connected to a first input of the fourth NOT gate;

an output of the fourth buffer is connected to a second input of the third NOT gate;

an output of the fifth buffer is connected to a second input of the fourth NOT gate;

an output of the third NOT gate is connected to the logic module; and an output of the fourth NOT gate is connected to the logic module.

7. The motor driving circuit according to claim 6, wherein the third flip-flop and the fourth flip-flop are both Schmidt flip-flops.

8. The motor driving circuit according to claim 1, wherein the instruction recognition module is provided with turn-on instruction data and turn-off instruction data.

9. A motor driving chip, wherein the motor driving circuit according to claim 1 is integrated thereon.

10. A control method for a motor driving circuit, controlling the motor driving circuit according to claim 1 to control a drive motor to operate, and comprising:

selecting, by the channel selection module, the channel for the input signal to make the input signal to be connected to the isolating switch module or the instruction recognition module, or disconnected;

performing, by the instruction recognition module, the corresponding operation on the isolating switch module according to the inputted instruction; and receiving, by the isolating switch module, the instruction of the channel selection module and the instruction of the instruction recognition module to connect or disconnect the logic module; wherein when the logic module is connected, a push-pull module outputs a signal to control the motor to operate, and when the logic module is disconnected, the motor is in a non-operation state.

11. The motor driving circuit control method according to claim 10, further comprising:

detecting, by the noise detection module, an operation noise voltage of the motor driving circuit; and disconnecting the isolating switch module when the operation noise voltage is greater than a preset threshold.

12. The control method for a motor driving circuit according to claim 10, wherein the channel selection module comprises a first buffer, a second buffer, a third buffer, a first NOT gate, a second NOT gate, a first analog switch, a second analog switch, a first flip-flop, and a second flip-flop;

an input of the first buffer is connected to receive a first input signal, and an output of the first buffer is connected to a first input of the first flip-flop;

an input of the second buffer is connected to receive a second input signal, and an output of the second buffer is connected to a first input of the second flip-flop;

an input of the third buffer is connected to receive a third input signal, and an output of the third buffer is connected to a second input of the first flip-flop and a second input of the second flip-flop, respectively;

an input of the first NOT gate is connected to receive the first input signal, and an output of the first NOT gate is connected to an input of the first analog switch;

an input of the second NOT gate is connected to receive the second input signal, and an output of the second NOT gate is connected to an input of the second analog switch;

a first output of the first analog switch is connected to an output of the first flip-flop, a second output of the first analog switch is connected to an output of the second flip-flop, a third output of the first analog switch is connected to the isolating switch module, and a fourth output of the first analog switch is connected to the instruction recognition module; and a first output of the second analog switch is connected to the output of the first flip-flop, a second output of the second analog switch is connected to the output of the second flip-flop, a third output of the second analog switch is connected to the isolating switch module, and a fourth output of the second analog switch is connected to the instruction recognition module.

13. The control method for a motor driving circuit according to claim 12, wherein the isolating switch module comprises a first AND gate, a second AND gate, a third flip-flop, a fourth flip-flop, a fourth buffer, a fifth buffer, a third NOT gate, and a fourth NOT gate;

a first input of the first AND gate is connected to a noise detection module, a second input of the first AND gate is connected to the instruction recognition module, and an output of the first AND gate is connected to an input of the fourth buffer;

a first input of the second AND gate is connected to the noise detection module, a second input of the second AND gate is connected to the instruction recognition module, and an output of the second AND gate is connected to an input of the fifth buffer;

an input of the third flip-flop is connected to the third output of the first analog switch, and an output of the third flip-flop is connected to a first input of the third NOT gate;

an input of the fourth flip-flop is connected to the third output of the second analog switch, and an output of the fourth flip-flop is connected to a first input of the fourth NOT gate;

an output of the fourth buffer is connected to a second input of the third NOT gate;

an output of the fifth buffer is connected to a second input of the fourth NOT gate;

an output of the third NOT gate is connected to the logic module; and an output of the fourth NOT gate is connected to the logic module.

14. The control method for a motor driving circuit according to claim 13, wherein the selecting, by the channel selection module, the channel for the input signal to make the input signal to be connected to the isolating switch module or the instruction recognition module, or disconnected comprising: when the input of the third buffer is at a rising edge, when the input of the first NOT gate being at a high level, and when the input of the second NOT gate is at a low level, a signal channel between the input signal and the instruction recognition module being connected.

15. The control method for a motor driving circuit according to claim 13, wherein the selecting, by the channel selection module, the channel for the input signal to make the input signal to be connected to the isolating switch module or the instruction recognition module, or disconnected comprising: when the input of the third buffer is at a rising edge, when the input of the first NOT gate is at a low level, and when the input of the second NOT gate is at a high level, a signal channel between the input signal and the isolating switch module being connected.

16. The control method for a motor driving circuit according to claim 13, wherein the selecting, by the channel selection module, the channel for the input signal to make the input signal to be connected to the isolating switch module or the instruction recognition module, or disconnected comprising: when the input of the third buffer is at a rising edge, when the input of the first NOT gate is at a high level, and when the input of the second NOT gate is at a high level, the channel being disconnected.

17. The control method for a motor driving circuit according to claim 10, wherein the instruction recognition module defines a turn-on instruction of 0x11 0x22 0x33 0x44 and a turn-off instruction of 0x55 0x66 0x77 0x88.

18. The control method for a motor driving circuit according to claim 13, wherein the receiving, by the isolating switch module, the instruction of the channel selection module and the instruction of the instruction recognition module to connect or disconnect the logic module comprises: the input of the instruction recognition module being set to be a low level, the clock signal and the data signal of the instruction recognition module being input, the second inputs of the first AND gate and the second AND gate being set to be a high level if it is determined that input data are identical with a turn-on instruction, and if a noise voltage detected by the noise detection module is lower than a reference voltage, the first inputs of the first AND gate and the second AND gate being set to be a high level, a channel between the isolating switch module and the logic module being connected, and the motor being driven and controlled via the input of the third flip-flop and the input of the fourth flip-flop.

19. The control method for a motor driving circuit according to claim 13, wherein the receiving, by the isolating switch module, the instruction of the channel selection module and the instruction of the instruction recognition module to connect or disconnect the logic module comprises: the input of the instruction recognition module being set to a low level, the clock signal and the data signal of the instruction recognition module being input, and if it is determined that input data are identical with a turn-off instruction, the second input being set to be a low level, and a channel between the isolating switch module and the logic module being disconnected; when the first inputs of the first AND gate and the second AND gate, or the second inputs of the first AND gate and the second AND gate are set to be a low level, an output of the third NOT gate and an output of the fourth NOT gate outputting a high level to the logic module in default, the chip operating in a Break mode, and the motor not operating.

* * * * *